(12) United States Patent
McComb (10) Patent No.: US 7,706,567 B2
(45) Date of Patent: Apr. 27, 2010

(54) ASSURED DOCUMENT AND METHOD OF MAKING

(75) Inventor: Robert McComb, Mississauga (CA)

(73) Assignee: Certifi Media Inc., Union Hill, NY (US)

( * ) Notice: Subject to any disclaimer, the term of this patent is extended or adjusted under 35 U.S.C. 154(b) by 970 days.

(21) Appl. No.: 11/454,673

(22) Filed: Jun. 16, 2006

(65) Prior Publication Data

US 2007/0291977 A1 Dec. 20, 2007

(51) Int. Cl.
*G06K 9/00* (2006.01)
(52) U.S. Cl. .................. 382/100; 358/402; 358/504
(58) Field of Classification Search ........... 382/100; 358/402

See application file for complete search history.

(56) References Cited

U.S. PATENT DOCUMENTS

| 5,912,974 | A | * | 6/1999 | Holloway et al. ............ 380/51 |
| 2005/0024695 | A1 | * | 2/2005 | Prakash ..................... 358/504 |
| 2005/0040642 | A1 | * | 2/2005 | Jiang ........................... 283/81 |
| 2005/0071283 | A1 | | 3/2005 | Randle et al. |
| 2006/0106717 | A1 | | 5/2006 | Randle et al. |
| 2006/0221405 | A1 | * | 10/2006 | Matsumoto ................. 358/402 |

* cited by examiner

*Primary Examiner*—Samir A Ahmed
*Assistant Examiner*—Ruiping Li
(74) *Attorney, Agent, or Firm*—Louis S. Horvath (57) ABSTRACT

The present invention teaches techniques for creating scans of documents that are both secure from tamper and that are assured of satisfactory image quality. In particular, a method of producing an assured document is disclosed wherein the documents digital signature is combined with the scan quality in a secure way.

9 Claims, 6 Drawing Sheets

ASSURED DOCUMENT AND METHOD OF MAKING

BACKGROUND

The art and science of scanning has never been more important. The vastly improved bandwidth infrastructure associated with the Internet and the exponentially improving cost effectiveness for digital storage has compelled industry and governments to scan analog objects into digital form to improve maintenance costs and to dramatically broaden the availability of these documents using the Internet.

This surge in the digitization of documents is exemplified by Google Inc.'s 14 Dec. 2005 announcement that it is working with the libraries of Harvard, Stanford, the University of Michigan, and the University of Oxford as well as The New York Public Library to digitally scan books from their collections so that users worldwide can search them in Google.

Also, the Check Clearing for the 21st Century Act, which was signed into law and became effective on Oct. 28, 2004. This act is referred to as "Check 21" and is designed to foster innovation in the bank payments system and to enhance its efficiency by reducing some of the legal impediments to eliminating paper checks. The law facilitates paper check truncation (allowing banks to destroy paper checks once scanned) by creating a new negotiable instrument called a substitute check, which permits banks to minimize costs due to maintaining original checks, to process check information electronically, and to deliver substitute checks to banks that want to continue receiving paper checks. A substitute check is the legal equivalent of the original check and includes all the information contained on the original check.

One increasingly important area in the field of scanning is in providing security to the documents that have been scanned. For example, the Canadian government recently began a program to provide public Internet access to its heritage or historical repositories. Fears of the possible tampering with the government data compelled the Canadian Parliament to require that these organizations make "reasonable" attempts to ensure the integrity of the documents.

More broadly, increased awareness of security and privacy issues is resulting in national and international legislation on privacy and digital signatures. Examples of such legislation in the United States alone include the Electronic Signatures in Global and National Commerce Act (E-Sign), the Uniform Electronic Transactions Act (UETA), the Health Insurance Portability and Accountability Act (HIPAA), Gramm-Leach-Bliley (GLB) Financial Services Act, and the Government Paperwork Elimination Act (GPEA).

Once a document is scanned it is possible to change the contents of the scan by using an image editor, text editor (if converted to text) or by other means. To prevent this from happening, a digital signature of the document can be calculated and attached to the file header or filed into a database.

Digital signatures start by using the concept of a hash. A hash is distilled representation of a relatively large data record into a shorter reference value. What is desirable is to create the key from the data, but with a negligible likelihood of the same key being generated from two distinct records. Methods that perform this distillation are referred to as hash algorithms and they are used widely in computer systems. A digital signature is an encrypted version of the hash, typically using a public-key infrastructure (PKI) algorithm.

In Merkle et al., U.S. Pat. No. 5,157,726, issued Oct. 20, 1992, titled "Document copy authentication", a process for making an authenticatable copy of an original document supplied by an entity is disclosed. In this patent, a hard copy is made of an original document that incorporates on the document a digital signature representing the document contents and the identity of the said entity. This technique allows the source to be encoded in the hardcopy.

In U.S. Pat. No. 5,912,972, Barton, issued Jun. 15, 1999, titled "Method and apparatus for embedding authentication information within digital data", arbitrary digital information is embedded within a stream of digital data, in a way that avoids detection by a casual observer and that allows a user to determine whether the digital data have been modified from their intended form. The embedded information may only be extracted as authorized and may be used to verify that the original digital data stream has not been modified. This technique allows authentication data to be distributed in the actual digital data associated with the document.

While these approaches are extremely useful and reliable, they do not answer the issue of the scanned quality. If the scanner was out of calibration or otherwise not working correctly, the digitized document could be meaningless, erroneous or artifact laden, rendering an authenticity technology such as described above meaningless because the data they attempt to protect may be useless.

Knowing that the data that was scanned is a satisfactory replica of the original is clearly extremely important. Companies whose job it is to perform the scanning of important documents for governments, financial institutions and other concerns may become liable for loss of potentially priceless information should these scanners not be working correctly.

Under the current art, it is possible to have a trusted human being review the freshly scanned document for integrity and optimal image quality before submitting the document to a secure hashing algorithm. However, given the fact that typically a tremendous number of documents must be scanned, a human based quality control solution is not economically viable. Compounding this, human error rates may be significant and beyond the threshold of customer tolerance.

SUMMARY OF THE INVENTION

The present invention is directed at overcoming the problem set forth above in an efficient and automated manner. In particular, the present invention provides means to ensure the that a document is scanned using the proper image quality while simultaneously providing means for certifying that the that the document has not been changed.

DETAILED DESCRIPTION OF THE INVENTION

Figure 1:
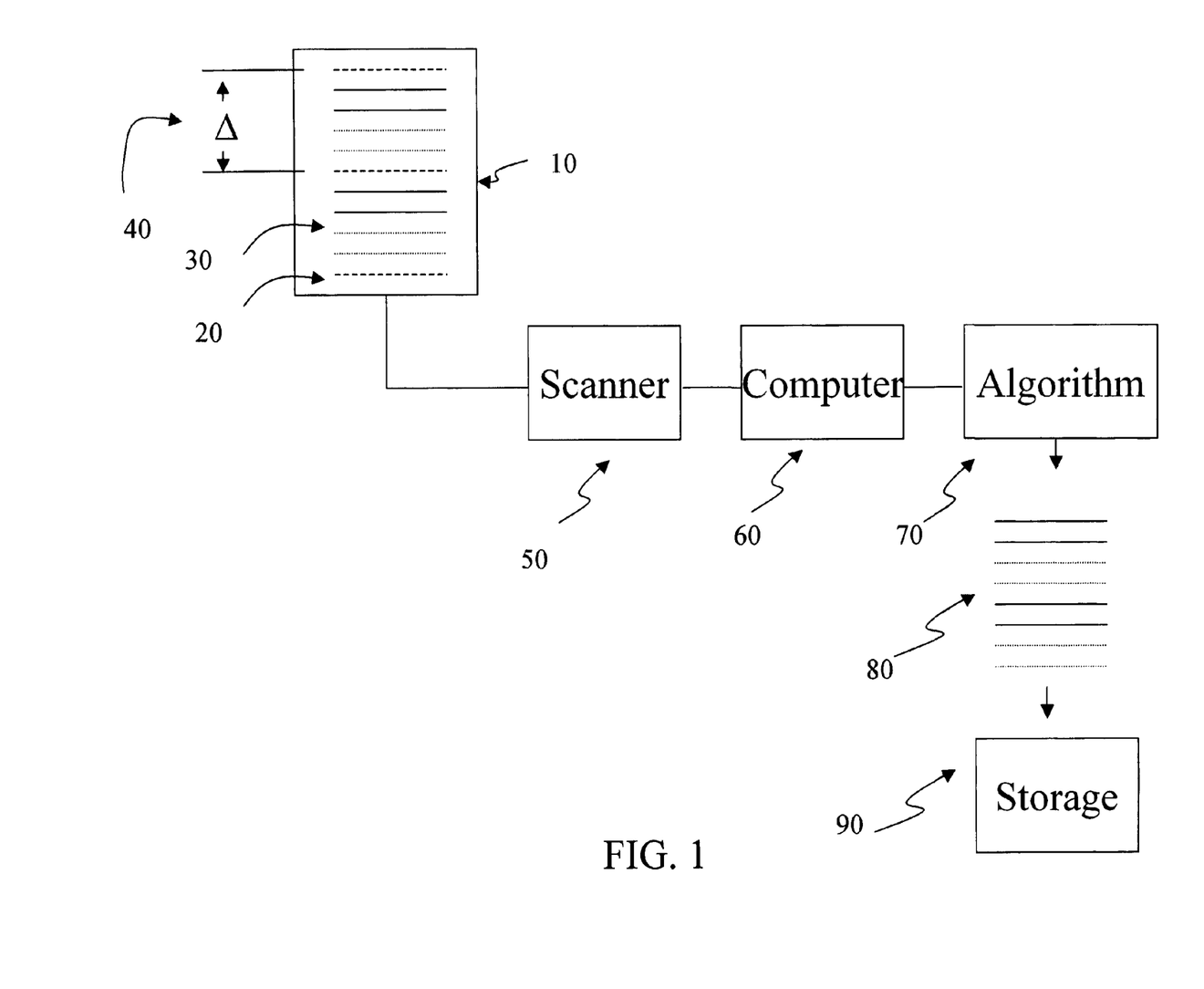
FIG. 1 shows a diagram representing the major components of the invention starting from the input documents to the storage of the digitized form.

Refer to FIG. 1 which depicts a broad view of the processing flow of the invention. Box 10 represents the input document queue of a document scanner 50. In the document queue are test target images 20 represented by dashed lines and documents it is wished to scan and archive 30 which are represented by solid lines.

By the word "document", it is meant bank checks, X-ray film, photographic film, historical letters, scholarly papers, photographs, income tax forms, magazine pages or any paper, plastic or otherwise scannable material. The phrase "document queue" is intended to refer to a plurality of documents it is wished to scan and archive. These documents may reside in a physical feeding mechanism on the scanner or may be manually fed to the scanner over a short or long period of time.

The symbol delta, $\Delta$, 40 represents an interval in which test targets are interspersed with documents to measure scan quality. It is known to those skilled in the art of scanning that image quality output of scanners degrade as a function time and as a function of the number of documents scanned.

This interval can therefore be an interval of time or an interval of a number of documents in which a test target is inserted into the processing flow. Generally, if a large scanning job comprising many documents is to be performed over a couple of days then the interval should be measured in terms of the number of documents. For example, if a scan job requires scanning 100,000 documents over two days, the symbol Δ, 40 should be measured in number of documents scanned. If the scanner is a high end scanner such as a Fujitsu fi-5530C Sheet-Fed Scanner, after every 250 scans a test target should be inserted in such a job. Alternatively, if the scanner is rarely used then a test target should be inserted after every two days.

In a preferred embodiment, an experiment is performed that measures the changes in dynamic range, modulation transfer function (MTF), color fidelity and noise as a function of time and as a function of the number of documents scanned. From this data, a tolerance defined in terms of time duration from last scanner calibration and in terms of the number documents scanned from the last scanner calibration is specified and Δ is set to guarantee a high fidelity operation of the scanner. Δ therefore may be two values, that is, a vector, for example, 250 scans and two days. If 250 scans occurs before two days, then the scanner must be recalibrated. Conversely, if two days occurs after 250 scans, then the scanner must be recalibrated after 250 scans.

After this interval is determined, test targets and documents are arranged in accordance with the interval Δ. The scanner 50 reads in from the queue either a test target or a document. In a preferred embodiment the scanner scans what has been input to the scanning mechanism and places the digitized test target or document into the RAM (Random Access Memory) of a computer 60. (It is also possible to write the scanned data to the computers hard drive, but this is not as efficient as using the RAM). Algorithm 70 produces the assured document and is enlarged in FIG. 2.

The term "assured document" is intended to mean that the scanned document has been secured using a digital signature and whose image quality has been measured and determined to be satisfactory. A secure document is known in the art as a document that cannot be changed without causing a contradiction in the hash associated with the document content and the associated digital signature. An assured document contains the digital signature and a measure of the image quality associated with the scan. A secure document may have little or no value if the scan produced artifacts or incorrectly captured the proper dynamic range, for example. An assured document, therefore, provides means to prove that a scan is free from malicious tamper and is a faithful rendition of the original.

In a preferred embodiment, the measure of image quality of the scan is also subject to an encryption and hence is secure as is the digital signature. It is easy to imagine that a secure document, for example a digital check, as described in the background section of this invention may be subject to question by attorneys (in a courtroom trial dealing with a fraud allegation) on the basis of image quality of the scan, despite the likely use of the bank of digital signatures. With the use of an assured document, the image quality measures are available and are also secure, minimizing the liabilities of parties to frivolous lawsuits.

A well-known such hash algorithm is the so-called Secure Hash Algorithm (SHA) of the U.S. National Institute of Standards and Technology (NIST). This Standard specifies a Secure Hash Algorithm, SHA-1, for computing a condensed representation of a message or a data file. When a message of any length <(2^64) bits is input, the SHA-1 produces a 160-bit output called a message digest. The message digest can then be input to the Digital Signature Algorithm (DSA) which generates or verifies the signature for the message. Signing the message digest rather than the message often improves the efficiency of the process because the message digest is usually much smaller in size than the message. Signing the digest also allows preserves the security of the scanned document while allowing the user to view the document without the problem of decrypting. The same hash algorithm must be used by the verifier of a digital signature as was used by the creator of the digital signature.

In a preferred embodiment of this invention, the secure signature used is the Secure Hash Algorithm SHA-1. SHA-1 is called secure because it is computationally infeasible to find a message which corresponds to a given message digest, or to find two different messages which produce the same message digest. Any change to a message in transit will, with very high probability, result in a different message digest, and the signature will fail to verify. SHA-1 is a technical revision of SHA (FIPS 180). A circular left shift operation has been added to the specifications in section 7, line b, page 9 of FIPS 180 and its equivalent in section 8, line c, page 10 of FIPS 180. This revision improves the security provided by this standard. The SHA-1 is based on principles similar to those used by Professor Ronald L. Rivest of MIT when designing the MD4 message digest algorithm ("The MD4 Message Digest Algorithm," Advances in Cryptology-CRYPTO '90 Proceedings, Springer-Verlag, 1991, pp. 303-311), and is closely modeled after that algorithm. SHA-1 and the science of digital signatures can be used to protect the authenticity of any scanned document. Users can rest assured that digitized document will remain provably authentic using this standard.

The output of the algorithm 70 is a stream or plurality of assured documents 80. These documents are then directed to a storage medium 90. The storage medium may be a magnetic storage disk, an optical storage disk or other archiving medium capable of storage of digital data.

Figure 2:
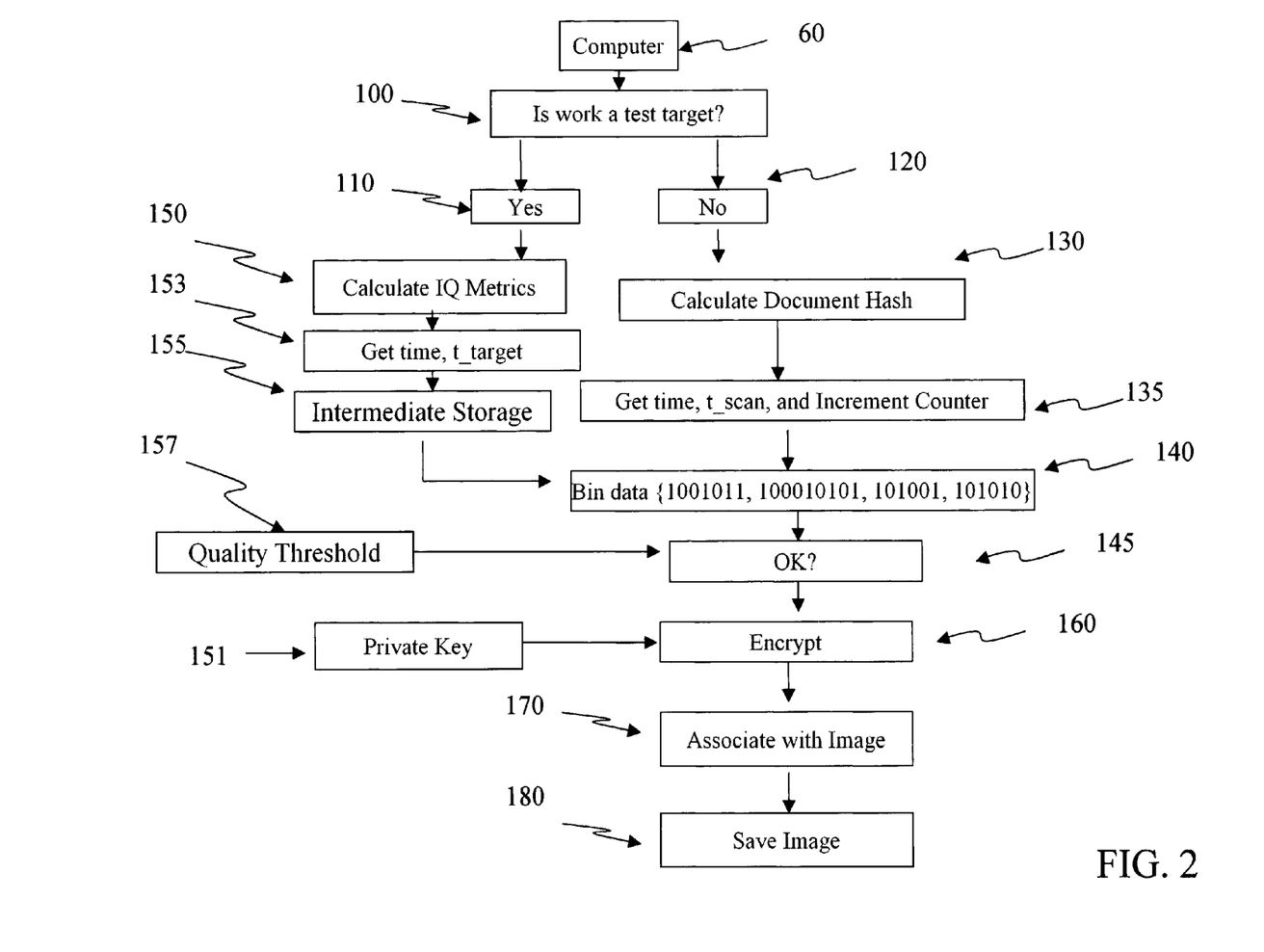
FIG. 2 represents the algorithm used to produce an assured document.

An enlarged version of the algorithm 70 is contained in FIG. 2. The RAM containing the scan on computer 60 is read and image data is submitted to a test target detector 100.

Figure 4:
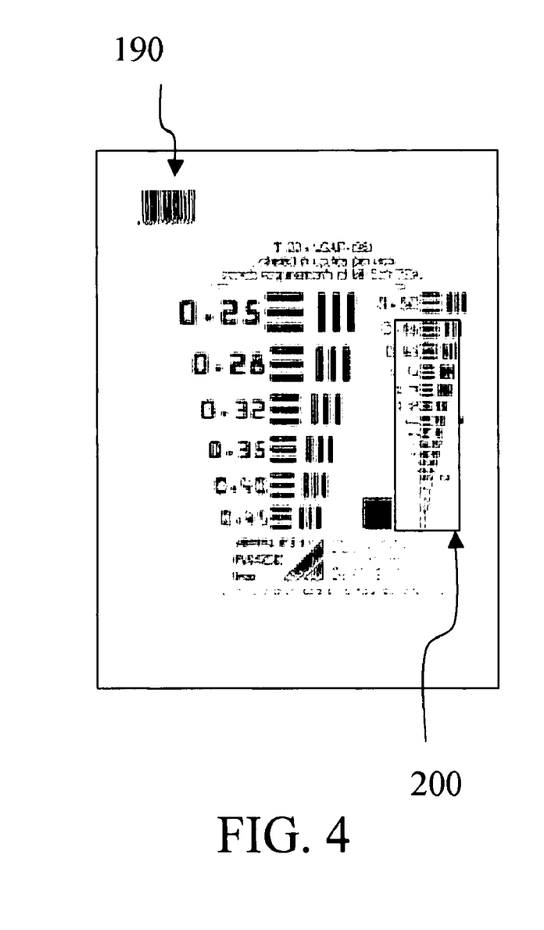
FIG. 4 represents an example test target with image fragment.

At this point the algorithm does not know if the scan is of a test target or a document. Therefore, the scan data is submitted to a test target detector 100. The test target detector requires that certain features of the test target be known ahead of time. In a preferred embodiment, the feature is a barcode that identifies the test target. An example of such a barcode and test target is shown in FIG. 4 with barcode 190. Barcode detection is very well known in the art, however, the barcode is best placed in a known region of the scan to reduce the amount of computation needed to find it. If the barcode is detected 110, a module is called 150 that identifies and calculates image quality metrics. The type of metrics will vary from application to application; however, nearly all should measure resolution, noise, dynamic range and for color scanners, color fidelity.

The art and science of measuring scanned document quality is well known and is a relatively mature field. The next few paragraphs intend to supply the reader of this invention with an instructive documentation available in the prior art that teach how to use the targets to measure image quality and what types of targets are available. A good overview of measuring quality is provided by: Rieger, Oya Y. "Establishing a Quality Control Program." In *Moving Theory into Practice: Digital Imaging for Libraries and Archives*, edited by Anne R. Kenney and Oya Y. Rieger, 61-83. Mountain View Calif. and provides keen insights into the subject.

Exemplary test target components that are readily available to meet these needs include:

| Digital Test Element | Target |
| --- | --- |
| Resolution | Sine wave pattern or knife-edge target (MTF) |
| Noise | Gray scale step (wedge) target or uniform gray patch |
| Dynamic range | Gray scale step (wedge) target |
| Flare | Uniform gray patch |
| Artifacts | Gray scale step (wedge) target or resolution charts |
| Tone reproduction | Gray scale step (wedge) target |
| Color reproduction | Color reproduction target |

A variety of targets are available from different sources, some with accompanying software to assist in interpreting the results of the targets. A selection of target and software providers is listed here for implementation of the present invention:

A&P International (Prescott, Wis.), Example: PM-189 Scanner Test Targets for resolution as recommended by AIIIM in MS44-1988 (R1993).

Applied Image Group/Imaging, Example: QA-62 and QA-72 Spatial Resolution test charts.

Edmund Industrial Optics (EO), Examples: Sinusoidal patterns (MTF), grayscale, ISO 12233 Resolution chart, and Macbeth Color Checker.

Mitre Corporation, Example: Free sinemif software measures MTF from digital images of sine patterns, Precision Optical Imaging:

Example: ISO 12233 and OECF targets.

Figure 5:
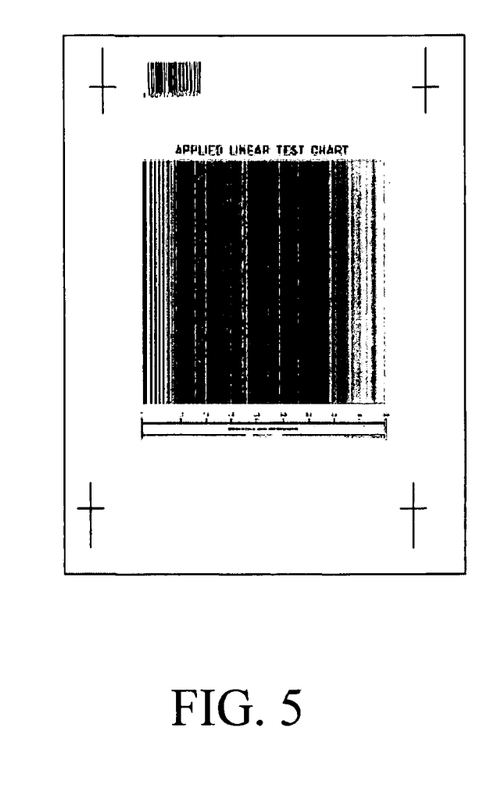
FIG. 5 represents an example test target.
Figure 6:
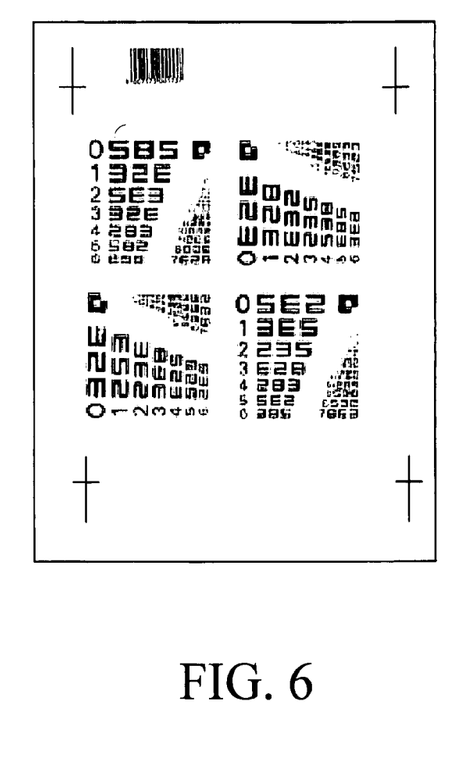
FIG. 6 represents an example test target.

Examples of test targets from the literature are shown in FIG. 4, FIG. 5. and FIG. 6. Some targets are optimal for photographs and some for text or binary type scans.

Returning now to the description of the invention and referring again to FIG. 2, image quality metrics 150 are calculated. The time is read from the computer 153 to document the time and is formatted into intermediate storage 155 along with the image quality metrics.

The process of calculating the image quality metrics can be automated by aligning the test target using fiducials to known dimensions and measuring, for example, noise by finding a blank area of the target and measuring the standard deviation, or MTF by finding an edge area and calculating the MTF (alternatively by using repetitive patterns of a plurality of pertinent frequencies), or by finding grayscale patches and measuring the average gray level to find the tonal reproduction values. The open literature is laden with ways and means to perform these measurements and it is clear that an automated processing and reporting of these metrics is obvious to those skilled in the art of image processing. Some particularly good representations of the prior art of automated detection of targets are found in U.S. Pat. No. 5,825,913, "System for finding the orientation of a wafer", U.S. Pat. No. 5,673,334 "Method and apparatus for inspection of characteristics on non-rigid packages", U.S. Pat. No. 5,640,200 "Golden template comparison using efficient image registration", U.S. Pat. No. 5,548,326, "Efficient image registration" and U.S. Pat. No. 5,500,906 "Locating curvilinear objects using feathered fiducials".

The calculated image quality metrics stored in intermediate storage 155 can include only the resultant metric such as noise level, (for example, a simple scaler such as 5.4 pixel counts may represent the noise standard deviation) or such as MTF, (an array of numbers representing the falloff of modulation as a function of spatial frequency, for example, 0.90 at ¼ Nyquist, 0.77 at ½ Nyquist, 0.55 at ¾ Nyquist and 0.23 at Nyquist). In an alternative embodiment, the intermediate storage may contain the resultant metrics and the actual test target image fragment used to calculate the metric. Including the test target image fragment allows a second measurement of the quality to be made for very strict environments. These numbers and possibly test target image fragments are placed adjacent to one another in a predetermined fashion in the intermediate storage and remain unchanged until the next test target is used. The concept of using an image fragment can be understood by referring to FIG. 4. By test target image fragment, it is meant that an important region of the test target 200 is cropped out of the target and stored with the scanned document. The value of including an test target image fragment in the scanned document is that image quality measures can be made later using possibly a plurality of image quality metrics, providing even greater assurance to the scanned document. Including the secure hash of the test target image fragment can prevent an unscrupulous entity from changing the test target image fragment in a meaningful way.

If the test target detection step 100 indicates that the scan is not a test target, the algorithm assumes that the scan is a document 120. The document image is subjected to a hashing operation 130. In a preferred embodiment, the hash is 160 bits.

The hash will form the basis for the digital signature and is a distilled representation the image data as scanned. After the hash has been calculated the increment counter is incremented by one and the time is determined by querying the system clock 135 of the computer.

This hash of the document image is combined with the time and the increment count which is the number of documents scanned since the last image quality metric calculation.

At this point, the algorithm collects all data from the last target scan and combines it with the extracted data from the document scan. This data includes the image quality metrics, the time of the last image target measurement, t_target, the image hash, the number of documents scanned since the last target scan, and the time of the document scan, t_scan. This Bin Data step 140 combines this data in a predetermined fashion.

Figure 3:
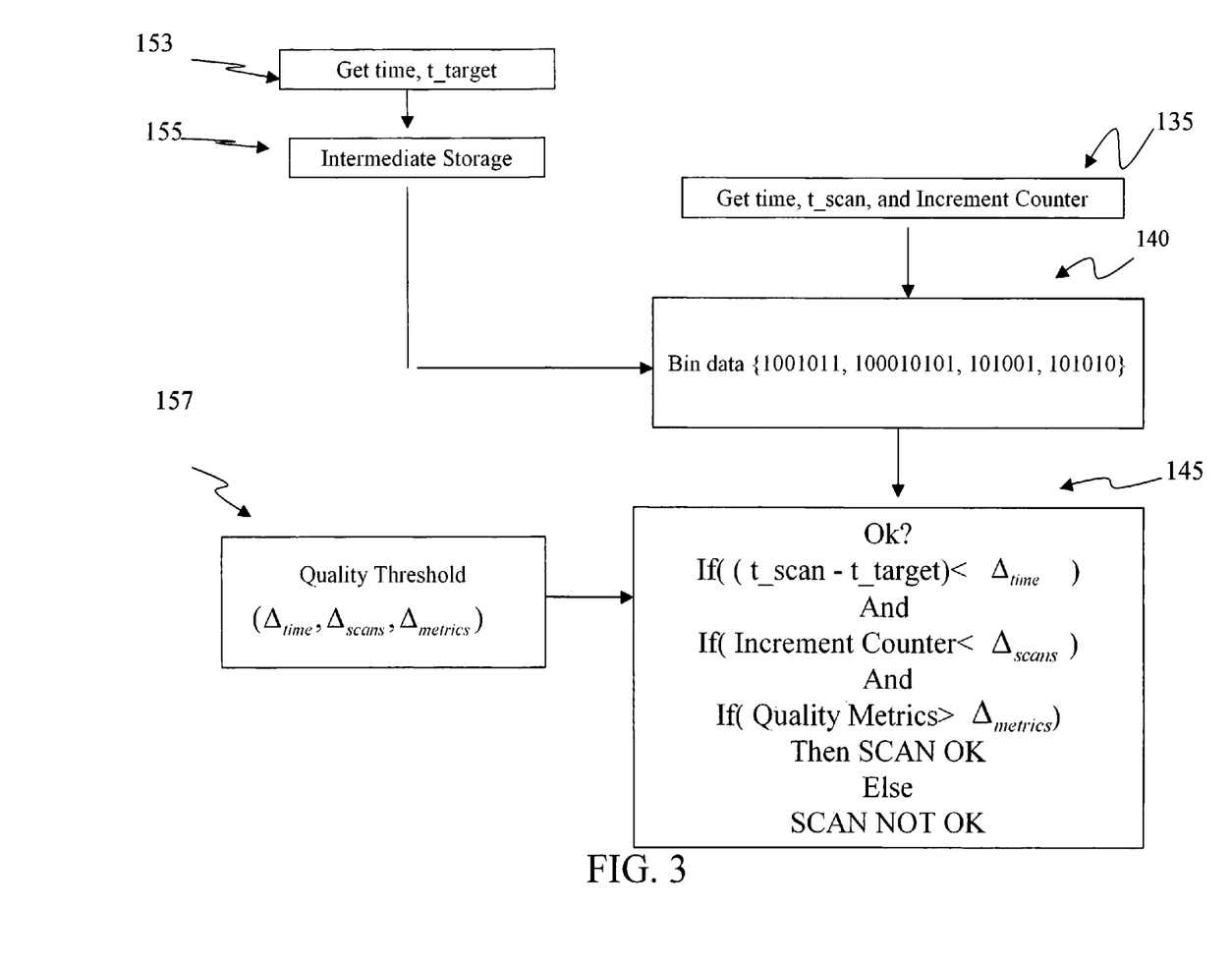
FIG. 3 represents the step to determine whether the scanned document is acceptable according to the input tolerances.

The next step determines whether the scanned document is acceptable according to the input tolerances. User input quality threshold values 157 are compared against calculated values in this "OK" step 145. This step is expanded in FIG. 3. Referring to FIG. 3 quality threshold tolerances ($\Delta_{time}$, $\Delta_{scans}$, $\Delta_{metrics}$) 157 are provided by the user. Measured values of these quality measures are calculated using data for the Bin data step 140 in the OK step 145. In particular, if: t_scan-t_target>$\Delta_{time}$ then the scan is not assured. Or if: increment_counter>$\Delta_{scans}$ then the scan is not assured. Lastly, if any of the calculated image quality metrics is less than the minimum value specified, then the document is not assured. Otherwise, the document is assured and the scan is OK.

In a preferred embodiment, termination of the scanning process is performed if the scanned document is not assured. This requires access to the scanners firmware and may not be readily available. In the case that the scanners firmware is not accessible, if the document is not assured, a separate GUI is launched in a new process to inform the user that a problem has occurred with documentation detailing the document it occurred at.

Referring to FIG. 2, if the scanned document is assured, then the contents of the Bin Data step are encrypted using a public/private cryptographic system such as the PKI system available from RSA Inc. The private key is provided 151 and is used to perform the PKI encryption. This set of resulting bits (encrypted bits) is stored within the image header 170 and the image is saved 180.

Figure 7A:
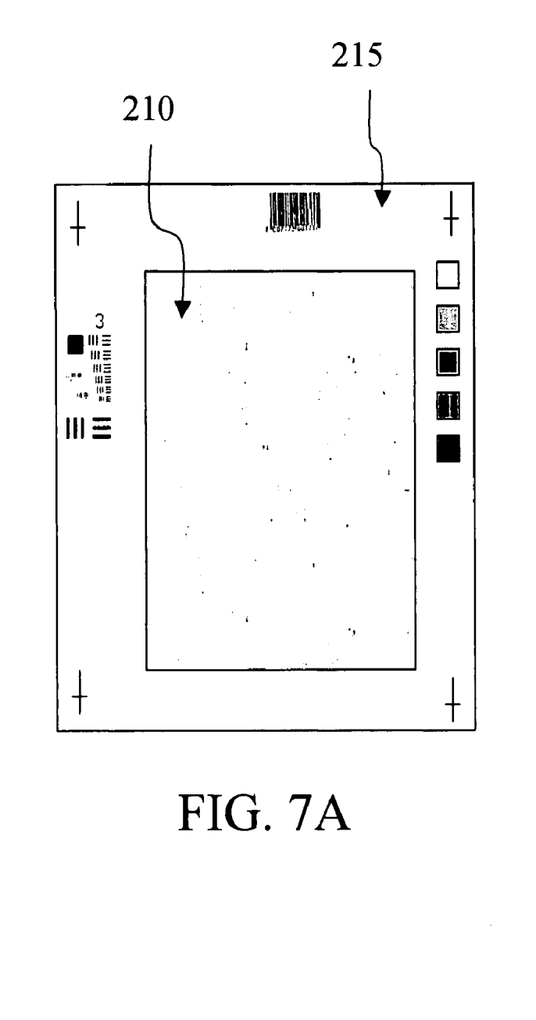
FIG. 7A represents another way to use test target and the idea of placing a document on a paper with a gum like material that has on its periphery test targets.
Figure 7B:
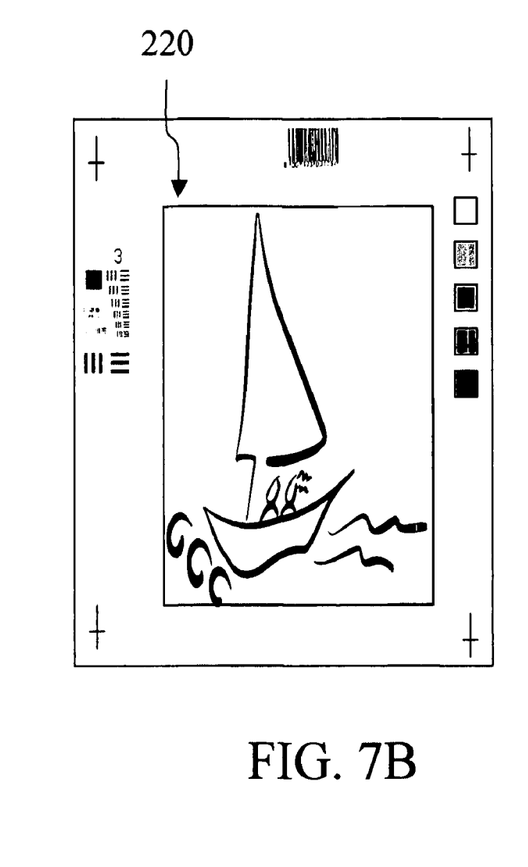
FIG. 7B shows FIG. 7A with a photo of a sailboat placed on the gum like material.

FIG. 7A represents another embodiment for usage of the test target. Here, the idea is to place a document on a paper that has on its periphery, the test target data 215. At the center region of the document there is a gum like material 210 placed. This gum like material is used to place and hold the document through the scanning process. This gum like material, in a preferred embodiment has the same properties as the gum like material features on the product "Post-It" notes sold by the 3M Corporation. The test target imagery is chosen in accordance with the art and document and scanner configuration. FIG. 7B shows the embodiment with a photo of a sailboat 220 placed on the gum like material. It is possible to use this embodiment for every scan or periodically between individual document scans as described in the previously disclosed embodiment.

Figure 8:
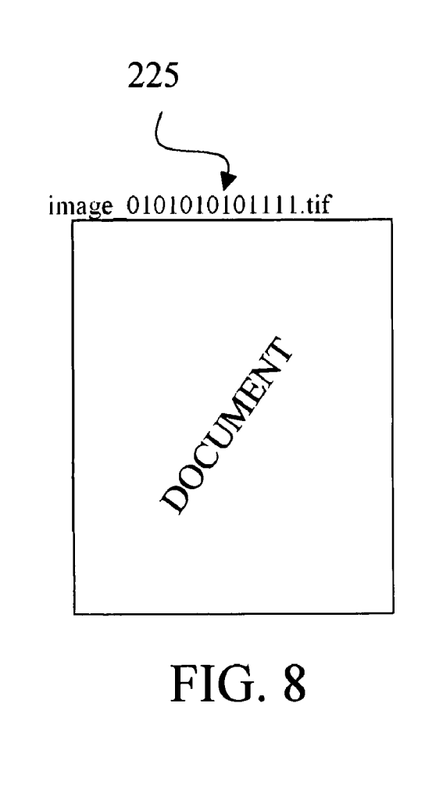
FIG. 8 shows the idea of including the encrypted image hash and image quality metric values hash in a file name of the scanned document.
Figure 9:
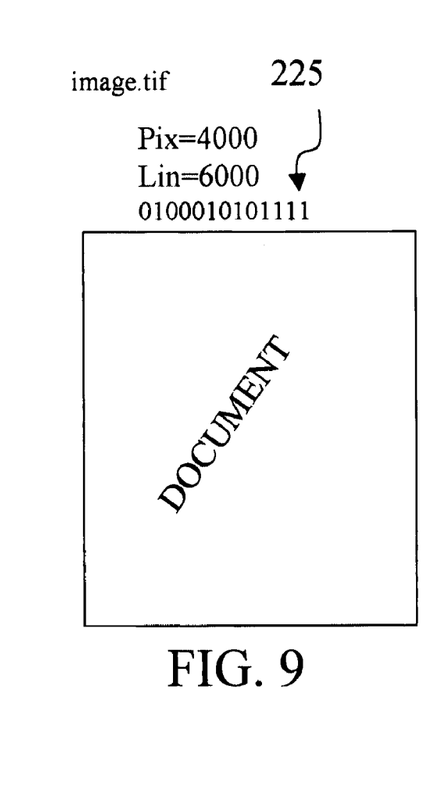
FIG. 9 shows the idea of including the encrypted image hash and image quality metric values hash in a file header of the scanned document.
Figure 10:
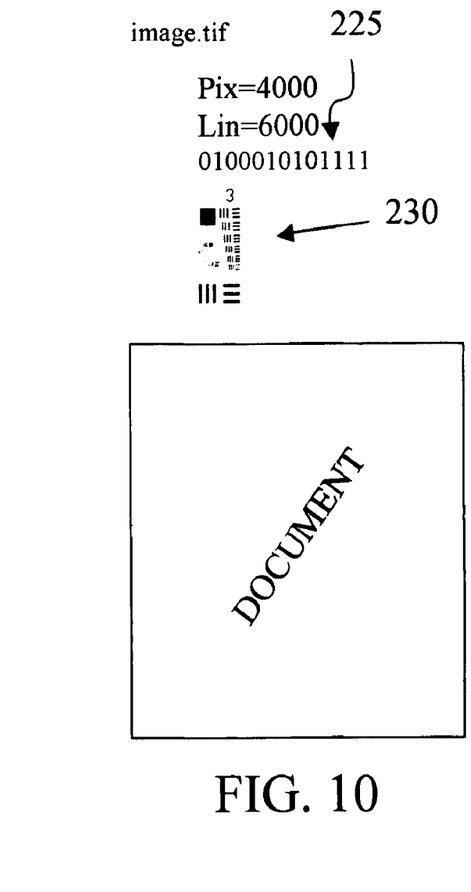
FIG. 10 shows the idea of including the encrypted image hash, image quality metric values hash and test target image fragment in a file header.

Representations of the quality of a scan can be achieved in numerous ways. It is appreciated that the encrypted hash of the scanned document and the image quality metric values can be encrypted separately, together as a concatenated value and by using one or more hash or encryption values. The encrypted values may be distributed in the scanned document pixels themselves using the techniques of U.S. Pat. No. 5,912, 972, Barton, "Method and apparatus for embedding authentication information within digital data" or by using digital watermarking techniques such as the plethora of those provided by the Digimarc Corporation. More practically, the encrypted bits can be embedded in the file name of the scanned document. FIG. 8 depicts a scanned document with the encrypted bits 225 (0100010101111) embedded in the file name "image0100010101111.tif". FIG. 9 depicts the idea of putting the encrypted bits 225 in the file header. TIFF and JPEG and many other format specifications have provisions for user defined data storage. Some file format specifications also allow for thumbnail images to be included or for more than one image to be included in one file. In these formats (TIFF has these provisions), the test target image fragment can be included within the file.

PARTS

5 Input document queue
10 Time Interval—The amount of time that must elapse before content is considered archival
20 Creation Time—The time at which content is considered to be created
30 Content—written expression of news, opinions, and curiosities associated with local, national and global events
40 interval in which test targets are used
50 Scanner
60 Computer
70 Algorithm that hashed, encrypts and computes image quality metric values
80 Assured document output stream
90 Storage for assured documents.
100 Test target detection step
110 Decision point when a test target is detected
120 Decision point when a scanned document is detected
130 Hash calculation step
135 Counter
140 Bin data step (aggregate hashed)
145 Test to determine if quality is withing tolance step
150 Calculate image quality (IQ) step
151 Private key input step
153 Get time of last scan for target and document
155 Intermediate storage
157 Input quality threshold step
160 Encryption step
170 Association of encrypted hashed with images step
180 Image saving step
190 Barcode used to identify test target
200 test target image fragment
210 Gum like material
215 Periphery containing test targets
220 Sailboat document
225 Encrypted hashed of the image quality metric values and scanned document

The invention claimed is:

1. A method for producing an assured document comprising:
    a) scanning a document to produce a scanned document;
    b) providing a representation of the quality of a scan according to image quality metrics obtained from test target image data;
    c) calculating a hash of the scanned document;
    d) encrypting the representation of the quality of the scan and the hash of the scanned document to form one or more encrypted values; and
    e) associating the one or more encrypted values with the scanned document, wherein the scanned document includes an image header and the association of the one or more encrypted values is achieved by storing the one or more encrypted values in the image header.

2. The method of claim 1, wherein the representation of the quality of the scan further includes at least one of a metric corresponding to the time that the scanned test target was produced and a metric corresponding to the number of documents that were scanned after the scanned test target was produced.

3. The method of claim 1, wherein representation of the quality of the scan further includes one or more test target image fragments.

4. The method of claim 1, wherein providing a representation of the quality of the scan further includes comparing the representation of the quality of the scan to quality threshold values.

5. The method of claim 1 wherein the image quality metrics obtained from the scanned document image data comprise one or more measurements of resolution, noise, dynamic range, or color fidelity.

6. The method of claim 1 further comprising comparing the image quality metrics against threshold tolerances.

7. The method of claim 1 further comprising aligning the test target using fiducials.

8. A method for producing an assured document comprising:
    a) scanning a document to produce a scanned document;
    b) providing a representation of the quality of a scan according to image quality metrics obtained from test target image data;
    c) calculating a hash of the scanned document;
    d) encrypting the representation of the quality of the scan and the hash of the scanned document to form one or more encrypted values; and
    e) associating the one or more encrypted values with the scanned document,
    wherein the scanned document has a filename and the association of the one or more encrypted values is achieved by storing the one or more encrypted values in the filename.

9. A method for producing an assured document comprising:
    a) scanning a document to produce a scanned document;
    b) providing a representation of the quality of a scan according to image quality metrics obtained from test target image data;
    c) calculating a hash of the scanned document;
    d) encrypting the representation of the quality of the scan and the hash of the scanned document to form one or more encrypted values; and
    e) associating the one or more encrypted values with the scanned document, wherein providing a representation of the quality of the scan further comprises detecting a barcode that identifies the test target.

* * * * *